(12) United States Patent  
Koppen et al.

(10) Patent No.: US 8,271,390 B2  
(45) Date of Patent: Sep. 18, 2012

(54) DIGITAL RIGHTS MANAGEMENT (DRM) LICENSE MANAGER

(75) Inventors: Eckhart Koppen, Tampere (FI); Timo Vataja, Tampere (FI); Simo Kivimaki, Tampere (FI)

(73) Assignee: Nokia Corporation, Espoo (FI)

( * ) Notice: Subject to any disclaimer, the term of this patent is extended or adjusted under 35 U.S.C. 154(b) by 2384 days.

(21) Appl. No.: 10/868,299

(22) Filed: Jun. 14, 2004

(65) Prior Publication Data

US 2005/0278716 A1 Dec. 15, 2005

(51) Int. Cl.  
*G06F 17/00* (2006.01)

(52) U.S. Cl. .............. 705/59; 705/50; 705/51; 705/57; 380/279

(58) Field of Classification Search .......... 705/1, 50, 705/59, 51, 57; 380/279  
See application file for complete search history.

(56) References Cited

U.S. PATENT DOCUMENTS

| | | | |
|---|---|---|---|
| 5,499,298 A * | 3/1996 | Narasimhalu et al. | 705/54 |
| 5,502,766 A * | 3/1996 | Boebert et al. | 713/193 |
| 5,563,946 A * | 10/1996 | Cooper et al. | 705/56 |
| 5,765,152 A * | 6/1998 | Erickson | 707/9 |
| 5,933,498 A * | 8/1999 | Schneck et al. | 705/54 |
| 6,006,332 A * | 12/1999 | Rabne et al. | 726/6 |
| 6,044,469 A * | 3/2000 | Horstmann | 726/29 |
| 6,226,618 B1 * | 5/2001 | Downs et al. | 705/1 |

* cited by examiner

*Primary Examiner* — Calvin L Hewitt, II  
*Assistant Examiner* — John M Winter  
(74) *Attorney, Agent, or Firm* — Alston & Bird LLP

(57) ABSTRACT

A method, device, and system including a digital rights management (DRM) license manager to protect software applications from unauthorized use. The DRM license manager system binds essential application data to a software license. This binding is achieved by adding an encryption key to a software license and encrypting the application data with that key. The essential application data is any kind of data which is required for proper operation of the program, such as media files, game levels or state tables. The DRM license manager system performs a check and decrypt operation of the essential application data during program run time. It requires that the license is available on the system. It also ensures that the decryption operation can only take place if the conditions defined in the license are met.

10 Claims, 4 Drawing Sheets

DIGITAL RIGHTS MANAGEMENT (DRM) LICENSE MANAGER

FIELD OF THE INVENTION

The present invention relates to digital rights management and device management. More particularly, the present invention relates to a digital rights management (DRM) license manager.

BACKGROUND OF THE INVENTION

Digital Rights Management ("DRM") is a term used to describe a range of techniques that use information about rights and rightsholders to manage copyright material and the terms and conditions on which the material is made available to users. More specifically, DRM involves the description, layering, analysis, valuation, trading, and monitoring of an owner's property rights to an asset. DRM covers the management of the digital rights to the physical manifestation of a work (e.g., a textbook) or the digital manifestation of a work (e.g., an Internet web page). DRM also covers the management of an asset whether the asset has a tangible or an intangible value. Current DRM technologies include languages for describing the terms and conditions for an asset, tracking asset usage by enforcing controlled environments or encoded asset manifestations, and closed architectures for the overall management of the digital rights.

In general, DRM protection is based on the principle that every end-entity able to consume DRM protected content is equipped with a cryptographic key, which usually is unique for every end-entity. DRM protected content is distributed, possibly together with a set of consumption rights, in encrypted form. Thus, only authorized parties, usually those that have paid for the content, are able to consume the content. This is done, for example, by encrypting the content with the public key matching the recipient's private DRM key (asymmetric key encryption). For practical reasons, usually a hybrid scheme is chosen, wherein DRM protected content is encrypted under a content encryption key (CEK) using symmetric encryption. The CEK in turn is then encrypted with the public DRM key matching the recipient's private DRM key. The CEK may be accompanied by consumption rights (which may also be encrypted) expressing the usage rules for the DRM protected content.

The effect is the same for both approaches, i.e., only authorized parties are able to consume the DRM protected content (if implemented securely and correctly). The two approaches, however, also share a drawback originating from the fact that every end-entity is equipped with a unique DRM key: content (or the CEK) has to be personalized for every device prior to consumption.

Usually, DRM content is protected (using encryption, for example) by the network side for various reasons, e.g., to guarantee payment for the content. Typically, the network infrastructure has a server for personalizing content transported in the wireless network. The network centric nature of current approaches, however, is not very suitable for certain types of content, e.g., free content. One example is content intended for preview purposes.

It is usually the case that the transfer of purchased, digital rights management (DRM)-protected content from one terminal to another cannot be performed by the end user of a terminal. Typically, the rights holders for the content want to enforce certain usage rights over content management, and this includes in most cases control over how content can be copied and which technical and security requirements have to be met.

Challenges in the context of DRM include handling the license data (e.g., distributing it to the user, checking it, managing it on the terminal), using the license data in a meaningful way, and preventing the unauthorized use of the application to be protected (e.g., copying or circumventing the rights checking). Conventional attempts at resolving these challenges do not tie the functioning of the software application to the license. Instead, only a simple check for a license is performed. Such simple checks are easily removed or manipulated.

Thus, there is a need to manage licensed software applications in a digital rights management (DRM) environment. Further, there is a need to combine copy protection mechanisms with rights management for software applications. Even further, there is a need for improved techniques for licensing, using, and preventing unauthorized use of data protected using DRM.

SUMMARY OF THE INVENTION

The present invention is directed to the use of a digital rights management (DRM) license manager to protect software applications from unauthorized use. The DRM license manager system binds essential application data to a software license. This binding is achieved by adding an encryption key to a software license and encrypting the application data with that key. The essential application data is any kind of data which is required for proper operation of the program, such as media files, game levels or state tables. The DRM license manager system performs a check and decrypt operation of the essential application data during program run time. It requires that the license is available on the system. It also ensures that the decryption operation can only take place if the conditions defined in the license are met.

Briefly, one exemplary embodiment relates to a method of managing licensed software applications in a digital rights management (DRM) environment. The method includes unpacking a software application package including application code, a control file, and one or more data files; encrypting the one or more data files; installing the application code into a terminal; and at run time for an application associated with the application code, verifying that a license corresponding to the application is present in the terminal and, if so, providing decrypted one or more data files to the installed application code.

Another exemplary embodiment relates to a device that includes a licensed software application subject to digital rights management (DRM) limitations. The device includes installed application code corresponding to a software application and a digital rights management (DRM) license checker. When the software application is run, the DRM license checker verifies that a license associated with the software application is present, and if the license is present, the DRM license checker decrypts an encrypted data file and provides the decrypted data file to the installed application code.

Yet another exemplary embodiment relates to a system for managing licensed applications. The system includes essential application data, a license checker, and a license manager. The essential application data includes data needed by an application for proper operation. When the application is run, the license checker verifies that a license associated with the essential application data is correct. The license manager provides application code for installation and encrypts essential application data that is provided to the application code at application run time if the license checker verifies that the license is valid.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Figure 1:
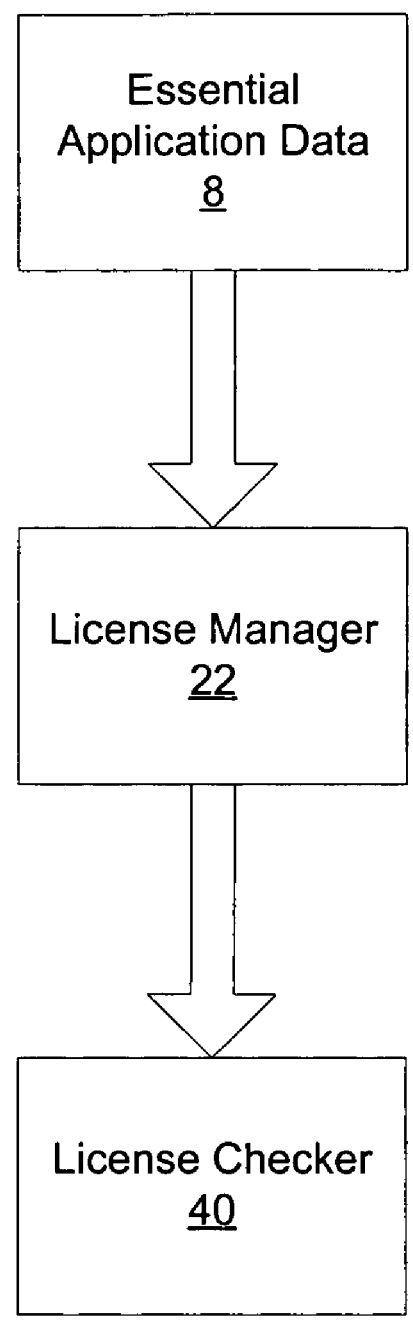
FIG. 1 is a diagram illustrating functional components in a digital rights management (DRM) license manager system.

FIG. 1 illustrates functional components in a digital rights management (DRM) license manager system. In an exemplary embodiment, the DRM license manager system includes essential application data 8, a license manager 22, and a license checker 40. The essential application data 8 is any data needed by a particular application for proper operation. The license manager 22 processes a software application package using the essential application data 8.

The software application package may or may not have an associated software license available on the terminal or system on which the software application is loaded. The license checker 40 determines if the correct license is present in the terminal or system. If the software license is available, the software application can be executed. Otherwise, it cannot.

Figure 2:
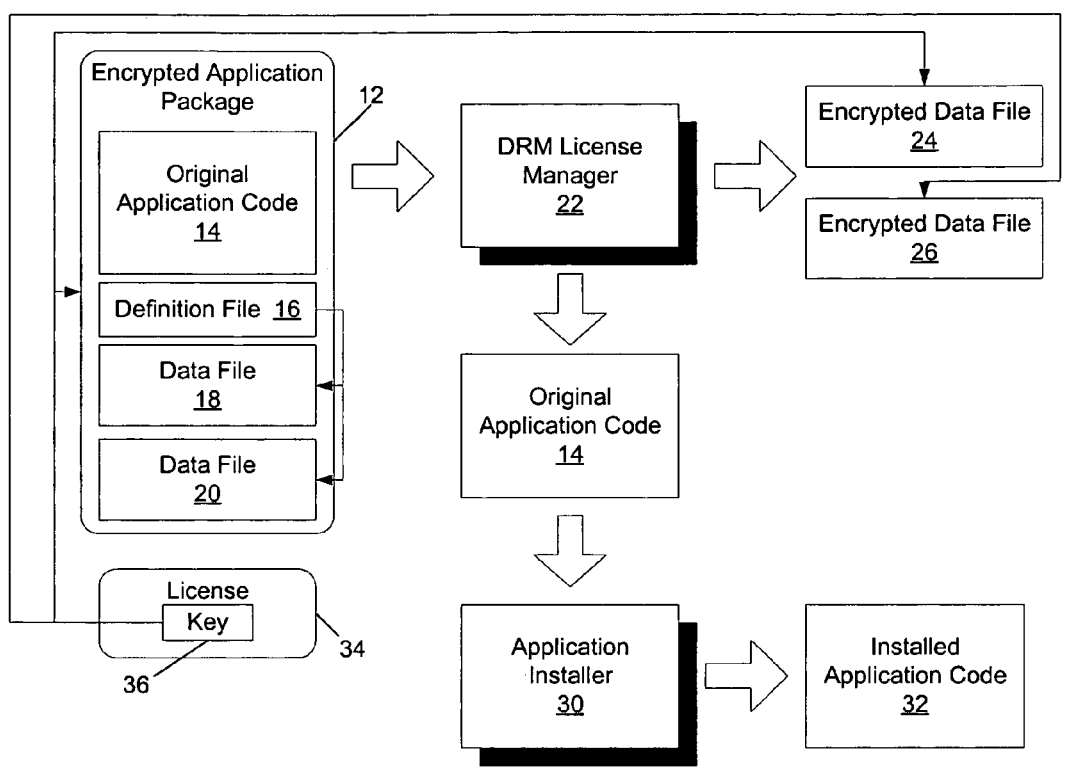
FIG. 2 is a diagram illustrating application packaging and installation in accordance with an exemplary embodiment.

FIG. 2 illustrates an application packaging and installation system in accordance with an exemplary embodiment. An encrypted application package 12 can include an original application code 14, a definition file 16, a data file 18, and a data file 20. The definition file 16 can include a list of data files, such as data files 18 and 20. The definition file 16 and the data files 18 and 20 are preferably packaged together with the original application code 14.

A software license 34 with an encryption key 36 is generated and used to encrypt the encrypted application package 12. The software license 34 can include various types of information relevant for implementing the license. For example, in one embodiment the software license 34 can include an actual encryption key, as well as a list of license constraints or conditions for setting establishing the license conditions, and user identification information for identifying the licensee. The encrypted application package 12 is provided to a digital rights management (DRM) license manager 22. The DRM license manager 22 decrypts and unpacks the application package, identifies the definition file 16 and data files 18 and 20, and encrypts the data files 18 and 20 using the encryption key 36 from the software license 34 to form encrypted data files 24 and 26. The DRM license manager 22 provides the original application code 14 to an application installer 30 which installs the code as installed application code 32.

Figure 3:
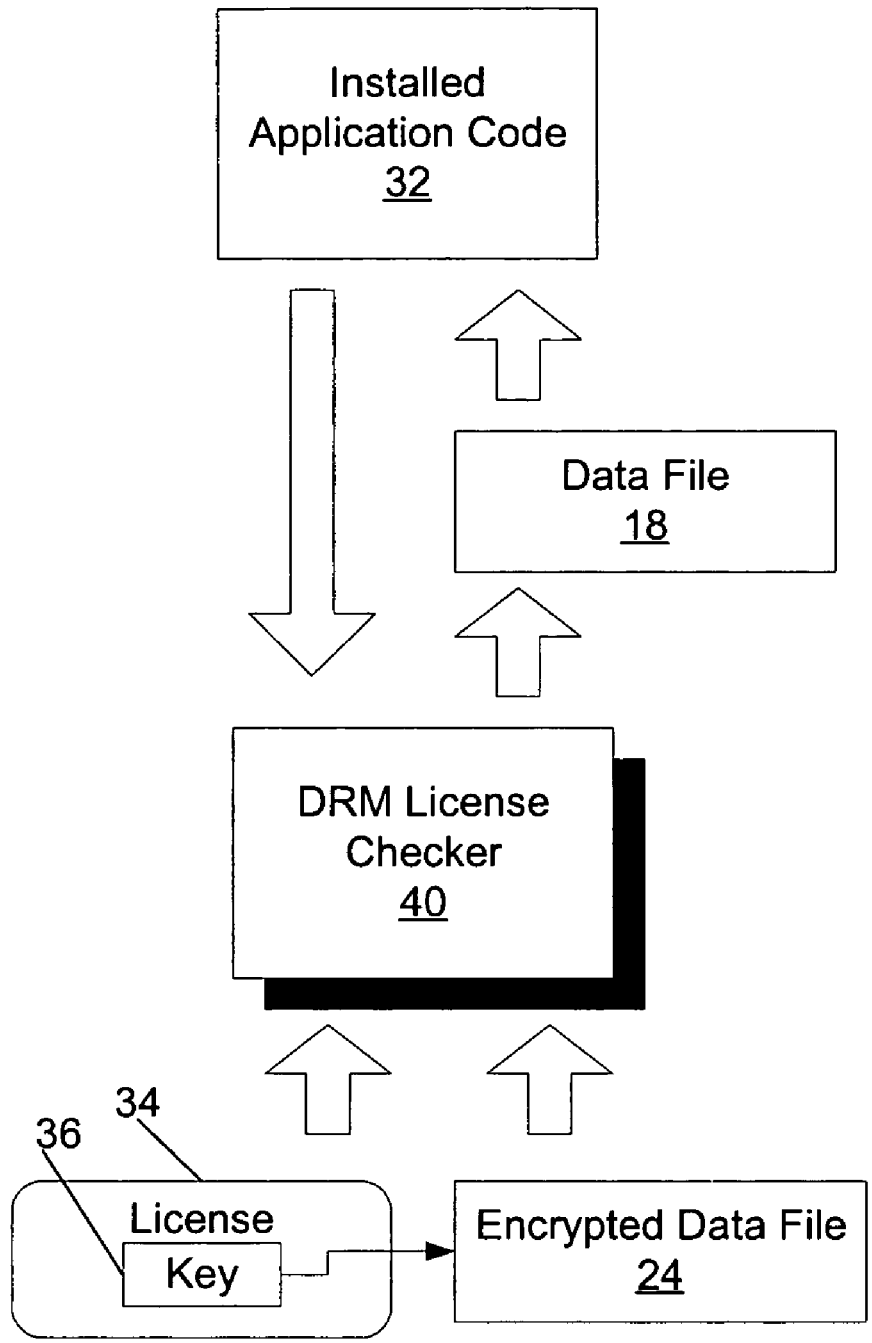
FIG. 3 is a diagram representing application usage of a data file in accordance with an exemplary embodiment.

FIG. 3 illustrates an application usage of a data file in accordance with an exemplary embodiment. A digital rights management (DRM) license checker 40 obtains the installed application code 32, the software license 34, and encrypted data file 24. The DRM license checker 40 verifies that the software license 34 is correct or, in other words, that the license is present on the system attempting to run the application and that the conditions stated in the license are met. Once the license is verified, the DRM license checker 40 returns decrypted data file 18 to the installed application code 32. The application can then use the data in the originally intended way. In the case where the license is not available, the data cannot be decrypted and the application does not function properly.

Figure 4:
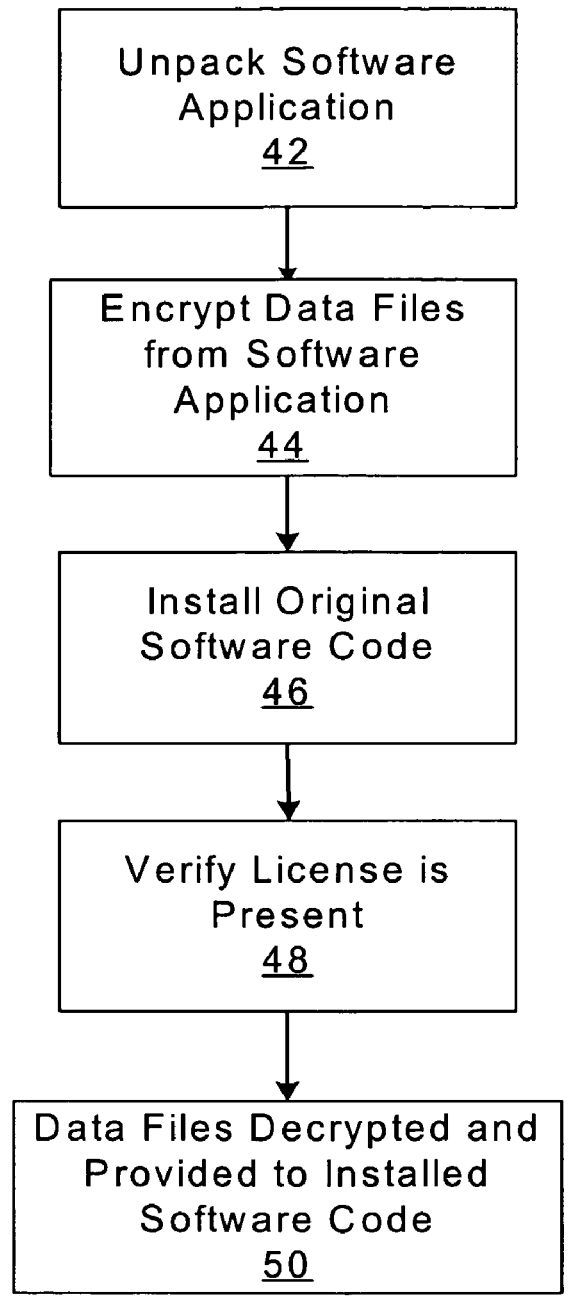
FIG. 4 is a flow diagram depicting operations performed in the digital rights management (DRM) license managing of the system of FIG. 1 in accordance with an exemplary embodiment.

FIG. 4 illustrates a flow diagram depicting operations performed in the digital rights management (DRM) license management system described with reference to FIGS. 1-3. Additional, fewer, or different operations may be performed, depending on the embodiment.

In an operation 42, an original software application code is decrypted and unpacked from an encrypted software application package. In addition to the original software application code, the encrypted software application package contains a control file and data files. In an operation 44, the data files are encrypted using the encryption key that is generated to encrypt the software application package. In an operation 46, the original software application code is installed for execution in a terminal or device.

Before the installed code can be executed, in an operation 48, a license checker verifies that a correct license is present in the terminal or device. Once verification of the license is performed, the encrypted data file that was unpacked from the software application package and encrypted is decrypted and provided to the installed application code, in an operation 50, such that the code can execute.

A license can be configured to control content in a variety of ways. For example, the license can be time-based allowing the end user to use the software application for a predetermined period of time (i.e. 30 days, 60 day, etc.). The period of time can begin upon any number of events, such as installation of the software application code or first use of the software application. Upon expiration of the predetermined time period, the license will expire and the decrypted data file will no longer be supplied to the software application effectively disabling use of the software application. The DRM license checker can be configured to check a timer to determine if the time period has expired or a separate application can be included for checking the timer and removing the license when the timer expires.

Another possible license scheme can be count-based. In other words, the end user can be granted a license to use the software application a predetermined number of time (i.e. 5, 10, etc.). A counter can be included to track each usage and after the end user has used the software application the predetermined number of times the decrypted data file will no longer be supplied to the software application disabling use of the software application. As with the time-based scheme discussed above, the DRM license checker or a separate application can be used to check the timer to determine when the license has expired.

A location or event-based scheme can also be used. In this scheme, the license can be tied to a location or event such as a conference or seminar. In this situation, the license can be tied to usage within a specific, predetermined geographical location, such as a conference hall or the city in which the conference is being held. The terminal on which the software application runs may be configured to include a position tracking device, such as GPS, and the DRM license checker (or a separate application) can be configured to check the location of the terminal, as provided by the position tracking device, to determine if the terminal is currently present in the predetermined geographical location. If it is, the decrypted application data can be supplied and the software application can be used. If not, the decrypted application data is not supplied disabling the software application.

In addition to the individual schemes described above, a combination of these schemes can be used. For example, in an event-based scheme allowing access to a software application during a conference, the DRM license checker (or another application) can check location, to determine whether the user is in the conference hall, and time, to determine that the conference is still in session. Other combinations can also be used. Furthermore, the license constraints (schemes) can be tied to individual users instead of terminals. In this situation, the DRM license checker (or another application) can first check the user login ID or the device SIM card to determine which license constraints (scheme) to use and then can determine if the license meets the constraints before providing the decrypted data files. Other constraints, such as a prohibition on copying, can be included along with the constraints specifically described herein.

Previous attempts at managing digital rights management licenses have not tied the functioning of the application to the license. Instead, a simple check if the license is available was performed. These simple checks can be easily removed or manipulated by an attacker. One advantage in the systems and methods described with reference to the FIGURES is the use of essential data which in turn is tied by encryption to the license.

This detailed description outlines exemplary embodiments of a method, device, and system for a managing licensed applications within a digital rights management (DRM) environment. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the FIGURES and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method of managing licensed software applications in a digital rights management (DRM) environment, the method comprising:
   unpacking by a processor a software application package including application code, a control file, and one or more data files; encrypting by a processor the one or more data files;
   installing the application code into a terminal; and at run time for an application associated with the application code, verifying that a license corresponding to the application is present in the terminal and, if so, providing decrypted one or more data files to the installed application code.

2. The method of claim 1, wherein the software application package is encrypted using an encryption key associated with a software license.

3. The method of claim 2, wherein the encryption key further includes at least one license constraint.

4. The method of claim 2, wherein the encryption key further includes user identification information.

5. The method of claim 2, the one or more data files are encrypted using the encryption key after the software application package is unpacked.

6. The method of claim 1, wherein unpacking a software application package comprises decrypting the software application package.

7. The method of claim 1, wherein the one or more data files comprise essential application data.

8. The method of claim 1, wherein the control file comprises a list of data files.

9. The method of claim 1, wherein unpacking a software application package and encrypting the one or more data files occurs at a second terminal different from the terminal, and the encrypted one or more data files are installed in the terminal.

10. The method of claim 9, wherein the terminal is a communication device.

* * * * *